United States Patent [19]

Rainer et al.

[11] Patent Number: 4,706,188

[45] Date of Patent: Nov. 10, 1987

[54] METHOD AND APPARATUS FOR READING SAMPLES OF A TIME-DEPENDENT SIGNAL IN A DATA PROCESSING SYSTEM

[75] Inventors: Alois Rainer, Villach, Austria; Walter Ulbrich, Pucheim; Lajos Gazsi, Bochum, both of Fed. Rep. of Germany

[73] Assignee: Siemens Aktiengesellschaft, Berlin and Munich, Fed. Rep. of Germany

[21] Appl. No.: 698,854

[22] Filed: Feb. 6, 1985

[30] Foreign Application Priority Data

Mar. 16, 1984 [DE] Fed. Rep. of Germany ....... 3409800

[51] Int. Cl.$^4$ ............................................ G06F 12/02
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,447,873 | 5/1984 | Price et al. | 364/200 |
| 4,509,187 | 4/1985 | Ackland et al. | 364/200 |
| 4,516,202 | 5/1985 | Kadowaki | 364/200 |

OTHER PUBLICATIONS

IBM Journal of Research Development, vol. 26, No. 4 of Jul. 1982, pp. 413–423.

Primary Examiner—Thomas M. Heckler
Attorney, Agent, or Firm—Hill, Van Santen, Steadman & Simpson

[57] ABSTRACT

A method and apparatus for preparing samples of a time-dependent signal (Se) in a data processing system which comprises an arithmetic unity (1), a control unit (2), a memory (3) and an address modification unit (13) wherein with a stored dataset of individual samples, for updating these step-by-step during every successive sampling period and respectively reading out the dated dataset and supplying it to the arithmetic unit (1), is achieved such that an address sequence which traverses a prescribed memory area is output via the address modification unit (13), so that a sequence of samples is written. Subsequently, the memory area is cyclically traversed with a plurality of address strings, whereby the stored samples are successively read out onto a bus line (4) and, when reaching an individual memory location within each of the address strings, the oldest sample stored there is overwritten by a further sample. The method is distinguished by a minimum of re-storing operations. The invention is used in signal processors, particularly those for filtering jobs.

10 Claims, 8 Drawing Figures

METHOD AND APPARATUS FOR READING SAMPLES OF A TIME-DEPENDENT SIGNAL IN A DATA PROCESSING SYSTEM

BACKGROUND OF THE INVENTION

1. Field of the Invention

This invention relates in general to method and apparatus for loading samples of a time-dependent signal in a data processing system.

2. Description of the Prior Art

The article entitled "A Microprocessor for Signal Processing the RSP" appearing in the IBM Journal of Research Development, Volume 26, No. 4, July 1982, Pages 413–423 discloses a signal processing systems that can be used for a number of applications including speech processing, image processing, radar, sonar, medical imaging and data communications, seismic procedures and many other applications. The described system includes real-time operation, dominance of arithmetic operations and well structured data flow. The real-time signal processor (RSP) is a microprocessor architect that was created to exploit the advantageous characteristics so as to provide an expeditious and economical way to implement signal processing applications.

SUMMARY OF THE INVENTION

The present invention relates to a method for sampling a time-dependent signal in a data processing system wherein samples of a time-dependent signal in a data processing system comprising an arithmetic unit 1, a control unit 2 and a memory 3 which is connected to the arithmetic unit 1. A first address modification unit 13 is mounted between the control unit and the address input of the memory 3 and in a first phase the address modification unit 13 produces outputs and address sequences which have individual addresses that cover a range of memory locations (Z1 ... Z5) having presubscribed range limits (Z1, Z5) in steps whereby sample (Y1 ... Y5) of the time dependent signal is written into each of the memory locations (P1 ... P5) and in a subsequent second phase an address sequence is output by means of which the range of memory locations (Z1 ... Z5) is cyclically traversed in the respective same direction in a plurality of runs whereby at one of said range limits (Z1) which is reached after the beginning of the first run, the sample stored under this address (Z12) as the oldest of the samples written during the first phase is replaced by means of writing a further sample (Y6) and wherein during each following run when reaching a respective individual address (Z23) which is shifted from run to run by one more step relative to the last range limit (Z1), the sample (Y2) stored in such address is replaced as the oldest sample written during the first phase which still is stored and is replaced by means of writing a further sample (Y7) and in that the other memory locations (P1 ... P5) addressed within all of the runs of the second phase are read out in cyclical sequence and the readout samples are supplied to the arithmetic unit (1).

The object of the invention is to store a plurality of sampled digital function values of the signal to be processed in a simple fashion in a memory of the data processing system and then read them out in order to supply them to the arithmetic unit of the system for further processing. The advantages of the present invention are that very little additional circuit outlay is required so as to successfully store a prescribed plurality of samples of the signal which are to be processed and to modify the dataset of the stored samples by means of every new sample in a fashion such that this respectfully replaces the respective oldest stored sample. This means that the stored dataset of samples is updated step-by-step and the respectively updated dataset can be read out in real-time mode in a simple fashion for further processing.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
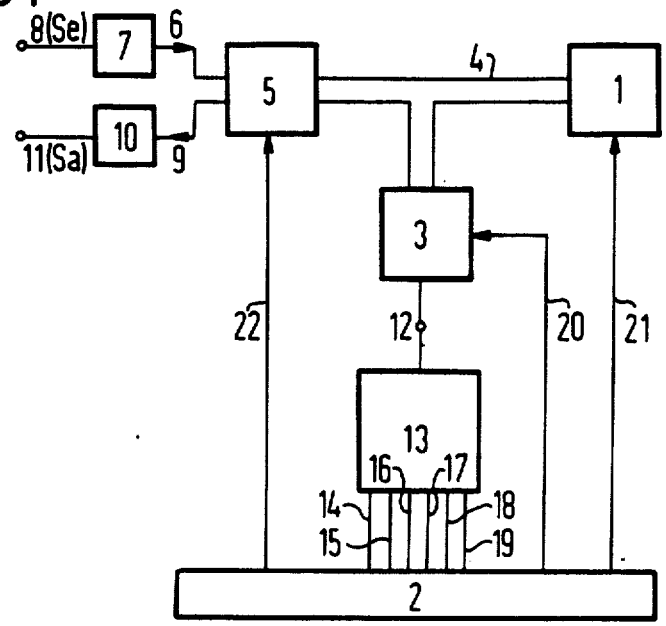
FIG. 1 is a block diagram of a data processing system for implementing the invention.

FIG. 1 illustrates a data processing system including an arithmetic unit 1 which is connected to a control unit 2. A memory 3 with random access (RAM) is connected to the arithmetic unit and to the control as illustrated. The arithmetic unit 1 is connected by bus line 4 to the memory 3 and to an input/output unit 5 which receives an input on n-lead line 6 from an analog to digital converter 7. Input terminal 8 supplies a signal Se to the input/output unit 7. The signal Se is a time dependent analog signal which is to be processed. The output of the input/output unit 5 is connected by n-lead line 9 to a digital to analog converter 10 which produces an output signal Sa at output terminal 11.

An address modification unit 13 is mounted between the controller 2 and the address input 12 of the memory 3 and a cyclical addressing of a prescribed memory area occurs by way of the address modification unit 13. This occurs by the emission of an address sequence which repeatedly cyclically covers a prescribed range of memory locations between a lower range limit and an upper range limit. Thus the individual addresses of the address sequence particularly proceding from the lower range limit traverses the range of memory locations in ascending direction in individual steps whereby a switch to the lower range limit is respectively undertaken after the upper limit range has been reached and a further address sequence which traverses the range of memory locations in steps in ascending direction is then subsequently produced. Cyclical addressing can be understood also to mean a sequence of addresses which are formed particularly proceeding from the upper limit range and traverse the range of memory locations step by step in descending direction whereby a switch to the upper range limit is respectively undertaken after the lower range limit has been reached and is continued with a further address sequence traversing the range of memory locations in descending direction. The lower range limit can be defined by a first n-place binary number which is input to the address modification unit 13 by the control unit 2 by way of n-lead line 14. The upper range limit is specified by a second n-place binary number which is input to the unit 13 by way of a n-lead line 15.

An address composed of a third binary number is input to the address modification unit 13 by way of a n-lead address input line 16 and the address being through connected to the output of address modification unit 13 by means of a signal on a control line 17. An onwarding of the address to the output of unit 13 to the next prescribed cyclical address sequence occurs by means of each instruction signal that is supplied to the unit 13 on a further control line 18. Also, an instruction signal is communicated to the address modification unit 13 by way of a control line 19 such that the address respectively adjacent to the output of unit 13 is through-connected once again. Instruction signals are communicated to the memory 3 by way of control line 20 and such instruction signals for example, initiating the memory either to write a binary number which is received by way of the bus line 4 into a memory location and is respectively addressed by way of the unit 13 or to read a binary number which is stored in a memory location which is respectively addressed by way of the unit 13 out onto the bus line 4. A group 21 of control lines serve for communicating instructions, for example, operational instructions between the control unit 2 and the arithmetic unit 1 whereas a group 22 of control lines is utilized so as to through-connect the line 6 through the input/output unit 5 in the direction toward the bus line 4 or signals on the bus line 4 in the direction toward the output line 9.

In operation an analog time dependent signal Se occurring at input terminal 8 is periodically sampled by the analog to digital converter 7 such that a sequence of digitized samples is formed and these respectively consist of n-place binary numbers Y1, Y2, Y3 etc. At the beginning of the method of the present invention, a prescribed plurality of such samples are successively transmitted through the input/output unit 5 which is correspondingly controlled by the group 22 of control lines and the samples are then transmitted onto the bus line 4 and then to the memory 3 where they are written into a corresponding plurality of memory locations. The memory locations are successively addressed by the address modification unit 13. Five memory locations P1 . . . P5 of which each is designed as n-place in other words, comprise n-memory cells are required for storing five samples Y1 . . . Y5 which, for example, are to be written into the memory 3.

Figure 2:
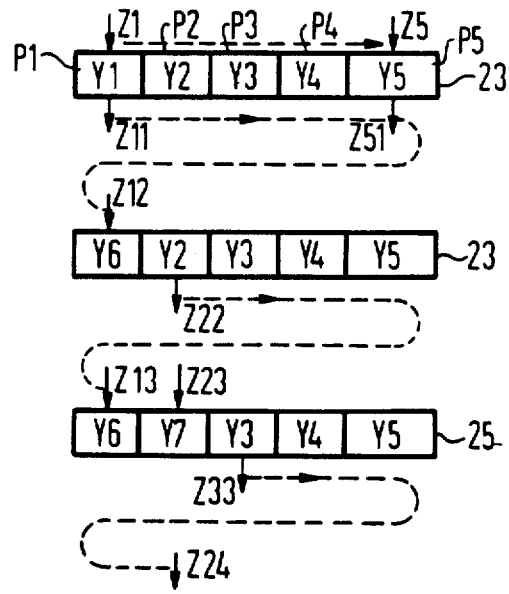
FIG. 2 comprises diagrams for explaining the invention.

FIG. 2 illustrates the memory locations P1 . . . P5 where they are schematically illustrated by a corresponding subdivided block 23. Addressing P1 . . . P5 synchronously occurs with the appearance of the individual samples Y1 . . . Y5 by means of an address sequence output by address modification unit 13 and having the individual addresses Z1 . . . Z5 which are illustrated in FIG. 2 by the indicators Z1 . . . Z5. By means of a simultaneous instruction "write" on the line 20, the sample Y1 is stored in P1 and the sample Y2 in P2 and so forth. The address sequence Z1 through Z5 can, for example, be generated in a fashion such that Z1 is input as a start address by way of the line 16 and is through-connected to the output of 13 by means of a first signal on the line 17. Four signals on the line 18 follow and these respectively cause an onwarding from Z1 to the further addresses Z2 through Z5. As was previously defined by means of inputing Z1 by way of the line 14 as the lower range limit and the address Z15 as an upper range limit the range of memory locations Z1 through Z5 are cyclically traversed step by step by means of instructions supplied by way of the line 18. A first phase of the method of the invention is completed with the storage of the signals Y1 . . . Y5.

A second stage which follows the range of memory locations Z1 through Z5 is multiply cyclically traversed in respective ascending direction. Five instruction signals are supplied to the address modification unit 13 by way of the instruction line 18 for each of such runs. The first five instructions cause, proceding from the most recently output address Z5, an address sequence Z11 through Z51 to be formed. During the appearance of this address sequence, the instruction "readout" is communicated to the memory 3 by the lines 20 so that the samples Y1 through Y5 stored in P1 through P5 are read out onto the bus line 4 and are supplied to the arithmetic unit 1 in which they are processed in a traditional fashion. Due to the next following instructional signal on line 18, the address modification unit 13 produces the address Z12 which corresponds to the lower range limit. The lines 20 are occupied with the instruction "write" during the output of these addresses so that the sample Y1 stored under the address Z1 which represents the oldest of the sample stored during the first phase is replaced or, respectively, overwritten by a new sample Y6. The instruction "read out" is forwarded onto the lines 20 upon appearance of the remaining addresses Z22 through Z52 within the second run.

During the third run, in other words, during emission of the addresses Z13 . . . Z53, the instruction "write" is communicated to the memory 3 on the lines 20 again only during the appearance of a single address which is the address Z23 whereas the instruction "readout" is allocated to all remaining addresses for this run. The sample Y2 stored in P2 which represents the oldest sample from phase 1 that still remains is thus replaced by a new sample Y7. By contrast, the remaining memory locations, in other words, P1, P3 through P5 are read out in the sample stored in them are supplied to the arithmetic unit 1.

A new sample is written when a single memory location is reached in each of the following address runs whereas the remaining memory locations are read out. When one considers the addresses to which a write instruction is respectively assigned in the individual runs, then a sequence Z12, Z23, Z34, Z45 and Z56 occurs whereby the appertaining memory locations are shifted in each run by one more place as compared to the memory location P1 allocated to the lower range limit Z1.

The first run of the second phase can be interpreted as a first readout period in which the samples Y1 through Y5 are read out and supplied to the arithmetic unit 1. In a second readout period starting with Z22, the values Y2 . . . Y6 are read out, the values Y3 . . . Y7 are read out in the third readout period beginning with Z23 and so forth so that further processing is respectively based on a dataset of samples that is updated from readout period to readout period. The output of the addresses Z1, Z2 ... Z5, Z12, Z23, Z34, Z45 and Z56 therefore occur in identical time intervals.

Figure 3:
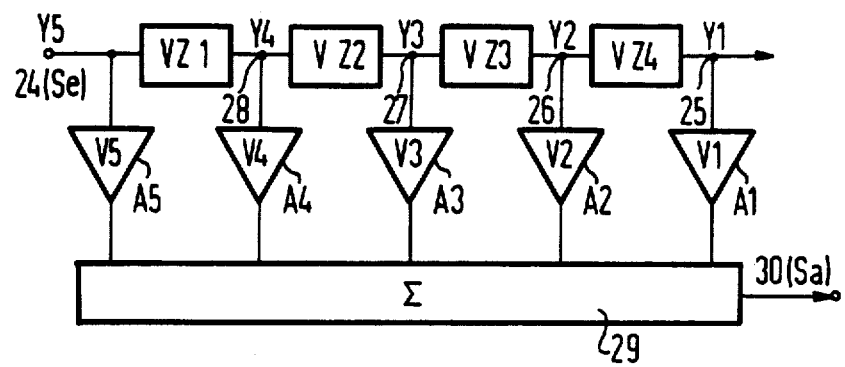
FIG. 3 comprises a block diagram of a transversal filter with general coefficients for explaining the invention.

The method according to the invention which is explained above can be advantageously employed so as to subject a signal Se to a filter function which corresponds to a transversal filter with general coeficients according to that illustrated in FIG. 3. In FIG. 3 the individual stages of a delay line are referenced as a VZ1 through VZ4 and the analog samples Y1 ... Y5 etc. of a signal Se at the input side are successively supplied at the filter input 24 and are respectively available after the fourth sampling period at the output of stages 25 through 28 as well as at the input 24. Amplifiers V1 through V5 which respectively have gains A1 through A5 are connected to the delay line as illustrated. The output of the amplifiers A1 through A5 are supplied as inputs to a summing circuit 29 which has an output 30 where the output signal Sa of the transversal filter can be removed. The gains of the amplifiers A1 through A5 represent the so-called filter coefficients or weighting factors. The signal Sa is derived in a fashion such that the products A1·Y1, A2·Y2 ... A5·Y5 are summed at a first time to form a first function value of Sa and the products A1·AY2, A2·Y3 ... A5·Y6 are summed to form a second function value of Sa at a second time which is offset in time relative to said first time by the delay time of one of the stages VZi etc. In the clock of the sampling of Se respective blocks of five samples such as Y1 ... Y5, Y2 ... Y6, Y3 ... Y7, etc. are thereby multiplied with the same filter coefficients A1 ... A5 and the corresponding products are summed.

The function values of the filtered output function Sa of FIG. 3 however, are also obtained with the data processing system of FIG. 1 when the sample supplied in the blocks to the arithmetic unit 1 which are Y1 ... Y5, Y2 ... Y6, Y3 ... Y7, etc. are respectively multiplied by the filter coefficients A1 ... A5 stored in a register of the arithmetic unit 1 and the resulting products are added to each other. The respective function values calculated in arithmetic 1 are then output onto line 9 by way of the bus line 4 and the corresponding through-connected input/output unit 1 and are converted into analog values in the digital to analog converter 10 and these are then available at the output 11. Particularly, after filtration with a low pass filter which follows the output 11 the total of analog values appearing at terminal 11 form an analog output signal Sa.

Figure 4:
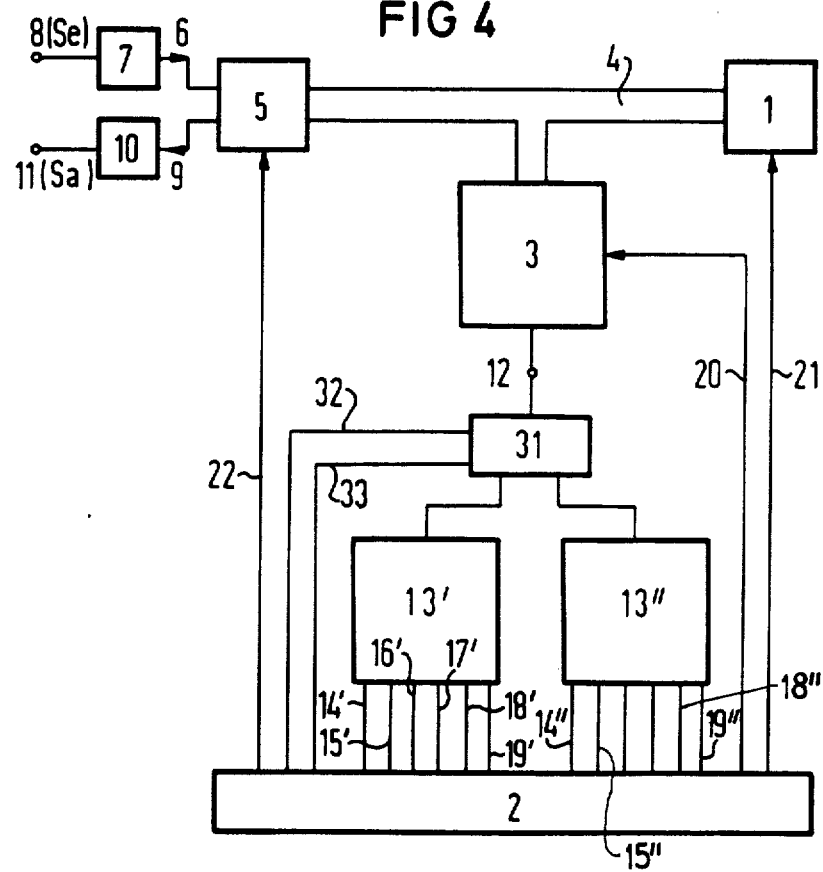
FIG. 4 illustrates a modified block diagram of the data processing system of FIG. 1.

FIG. 4 illustrates a modification of the circuit of FIG. 1 which includes two address modification units 13' and 13" rather than a single address modification 13 as illustrated in FIG. 1. The outputs of the address modification units 13' and 13" are connected to the input terminals of a multiplex circuit 31 which has its output side connected by conductors to the address input 12 of the memory 3. Two control lines 32 and 33 serve to respectively through-connect the outputs of address modification units 13' and 13" to the address input 12. The address modification units 13' and 13" may be constructed identical to unit 13 of FIG. 1. Lines 14' through 19' extend between the control unit 2 and the address modification unit 13'. Lines 14" through 19" extend between the control unit 2 and the address modification unit 13" and these lines correspond to the lines 14 through 19 between the address unit 13 and the control unit 2. The additional components of FIG. 4 are identical to the corresponding units in FIG. 1 in both function and structure. A first range of memory locations is input by way of the group lines 14' and 15' to the address modification unit 13' and the first range of memory locations are cyclically traversed in steps in a prescribed direction when instruction signals are supplied by way of the line 18'. On the other hand, a second range of memory locations is input by way of the group lines 14" and 15" to the unit 13" and the second range of memory locations are completely independent of the first range of memory locations and are likewise cyclically traversed in steps in a prescribed direction when instructions signals are supplied by way of line 18".

Figure 5:
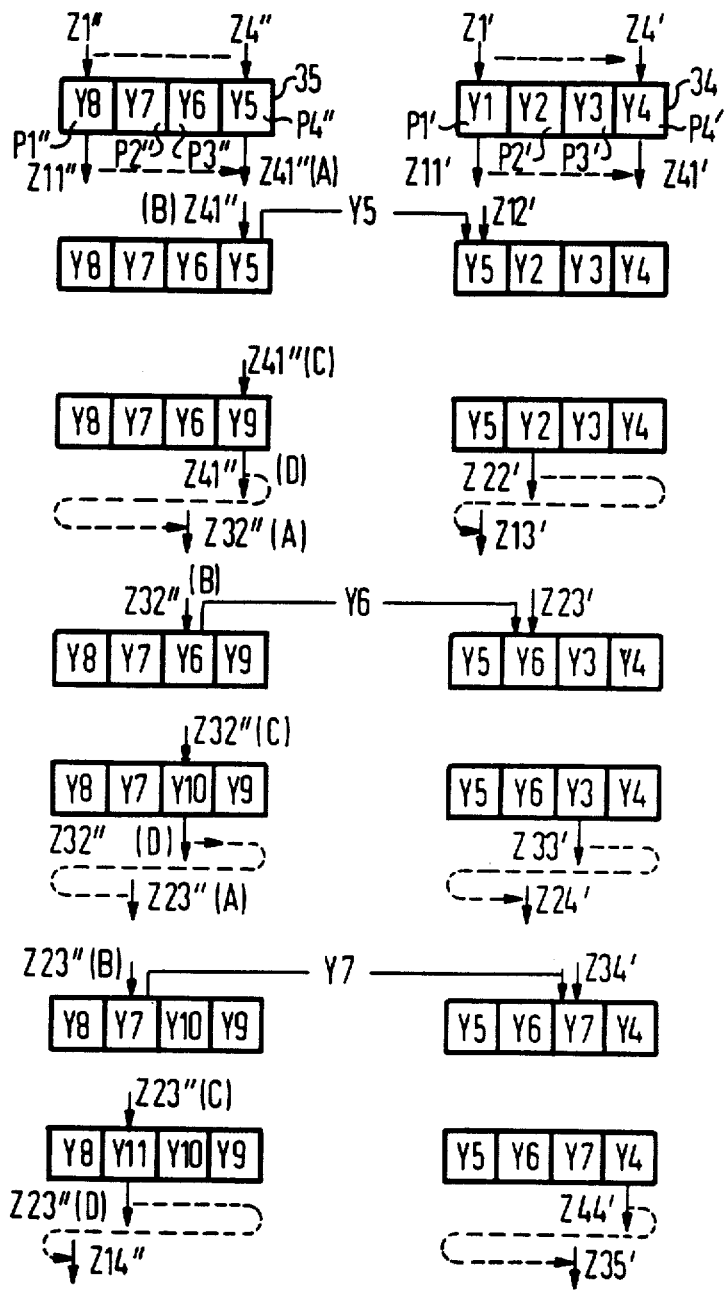
FIG. 5 comprises diagrams for explaining the embodiment of FIG. 4.

If it is assumed that the analog time dependent signal Se is periodically sampled by the analog to digital converter 7 whereby the digitized samples Y1, Y2, Y3 etc. arise then according to another method of the invention, a prescribed plurality of such samples, for example, Y1 ... Y4 are stored in a corresponding plurality of memory locations, for example, P1 ... P4' of the first memory area. FIG. 5 illustrates the memory locations P1' through P4' by subdivisions of a block 34 which represents the first memory area.

An addressing P1' ... P4' synchronously with the appearance of Y1 ... Y4 occurs by means of an address sequence output from the address modification unit 13' and comprises the individual addresses Z1' ... Z4' which are illustrated in FIG. 5 by the indicators Z1' ... Z4'. As a consequence of the simultaneous instruction "write" on line 20, Y1 is stored in P1', Y2 and P2' etc. The address sequence Z1' ... Z4' can be generated in the unit 13' in the same manner analogous to the generation of the address sequence Z1 ... Z5 in the unit 13 of FIG. 1. In addition, however, the output of the unit 13' will be through-connected in the multiplexer circuit 31 to the memory 3 and this occurs by means of a control signal on line 32. Subsequent thereto, a corresponding plurality of, for example, Y5 ... Y8 from the following sample of Se is stored in memory locations for example, P1" ... P4" of the second memory area. The memory locations P1" ... P4" are indicated in FIG. 5 by means of a subdivision of block 35 which represents the second memory area. The addressing of P1" ... P4" which is synchronously accomplished with the appearance of Y5 ... Y8 occurs by means of an address sequence output by address modification unit 13" and comprises the individual addresses Z4", Z3", Z2" and Z1" which are illustrated in FIG. 5 by these indicators. As a result of the simultaneous instruction "write" on line 20, Y5 is stored in P4", Y6 is stored in P3", Y7 is stored in P2" and Y8 is stored in P1". The address sequence Z4" ... Z1" can thus be generated such that Z4" is first input by way of the address input line 16" and is through-connected to the output of address modification unit 13" by means of an instruction signal on line 17" and this operation is respectively repeated for Z3", Z2" and Z1". However, the output of unit 13" must be through-connected in the multiplexer circuit 31 to the memory 3 and this occurs by means of a control signal on line 33. A first phase of the method of this modification of the invention is concluded with the roll-in of the samples Y5 ... Y8 into the second memory area 35.

In a following second phase, the address modification unit 13' is operated such that the range of memory locations Z1' through Z4' associated with the memory area 34 is repeatedly cyclically traversed in ascending direction. The cyclical addressing of P1' ... P4' which is indicated in FIG. 5 by the indicators Z11' through Z35' therefore correspond to the addressing of the memory locations P1 ... P5 as described with reference to FIG.

2 which a comparison of the right hand portion of FIG. 5 to FIG. 2 illustrates. It is only the instruction signals on the lines 20 associated to the addresses Z12', Z23', Z34' and so forth which deviate from the method explained relative to FIG. 2 and FIG. 1 as far as the "write" instructions are now replaced by instructions for "restoring" individual samples stored in the memory area 35 into the respective address memory locations of the memory area 34. Thus, for example, the address Z12' has the instruction for restoring Y5 from the memory location P4" into the memory location P1' addressed by Z12' allocated to it. The address Z23' has the instruction for restoring Y6 from memory location P3" into P2' allocated to it. The address Z34' has the instruction for restoring Y7 from memory location P2" into P3', etc. The instruction "readout" on the lines 20 is respectively allocated to the remaining addresses that are output by the unit 13' during the second phase.

During the second phase of the method performed by the apparatus of FIG. 4, the address modification 13" outputs a sequence of addresses so that the range of memory locations associated with the memory area 35 is repeatedly cyclically traversed in ascending direction. The addresses Z11" ... Z41" are thereby output in the first run. When the upper range limit defined by Z41" is reached, four instruction signals A through D are successively supplied to the memory 3 by way of lines 20 and the instructicnsignals A through D have the following meanings:

A: "readout of the sample (Y5) stored in the memory location P4" onto the bus line 4", B: "restoring the sample (Y) stored in the addressed memory location onto the memory location (P1) searched by the unit 13' with the next following address"

C: "writing the respectively next following sample (Y9) of Se which is supplied via the analog to digital unit 7, the line 6 and the input/output unit 5", and D: "readout of the newly written sample (Y9) onto the bus line 4."

The instruction B thus represents one of the restored instructions already mentioned relative to the address modification unit 13', and chronologically coincides with the output of Z12'by the unit 13'. The instruction C follows the instruction B without an onwarding of the addresses in the units 13' or 13" having previously occurred whereas the instruction D is issued at a time when the unit 13' has already onwarded to the next address: (Z22').

Thus, whereas the unit 13' successively outputs the addresses Z41', Z12' and Z22', the unit 13" only outputs the address Z41". When the units 13' and 13" are to be operated such that they respectively output their addresses during the same clock then given the appearance Z12' at the output of unit 13', the unit 13" can be controlled by way of the instruction line 19" so that it again outputs the address Z41" adjacent to the output. Likewise unit 13" can be initiated for the repeated emission of the addresses Z41" by way of the line 19" upon the appearance of Z22'.

The above described four instruction signals A through D are again allocated to a single memory location within the second address run of the second phase which is P3" or, respectively, the address C32". P3" is thereby shifted by one memory location relative to the memory location P4" associated with the upper limit of the range of memory locations. Analogous thereto the instruction signals A through D are issued during the course of the third address run when the memory location P2" or, respectively, the address Z23" is reached, thus, denoting a shift of two memory locations relative to P4". In a further run, the memory location to which the instructions A through D are allocated is then shifted by one more place relative to P4". Upon the appearance of the instructions B and D, the unit 13" is respectively started by way of the instruction line 19 to again through-connect the address already adjacent to its output. The four instruction signals A through D are thus allocated to the addresses Z41", Z32" and Z23" etc. The instruction "readout the respectively stored sample onto the bus line" on lines 20 is respectively allocated to all other addresses output by the address modification unit 13" during the second phase.

In the method of the invention explained relative to FIG. 5, the addresses Z1' ... Z4', Z4" ... Z1", Z41", Z32", Z23" etc. are outputs which are synchronous with the appearance of the samples Y1, Y2 etc. at the output of the analog to digital converter 7.

On the basis that the memory locations P1', P2' etc. of the memory area 34 and the memory locations P1", P2" etc. of the second memory area 35 are read out with respectively the same clock in the second phase of the method beginning with P1' and P1" and when the multiplexer circuit 31 is switched at twice the clock frequency by mutually offset signals on lines 32 and 33, then the samples Y1, Y8, Y2, Y7, Y3, Y6, Y4 and Y5 are successively read out to the bus line 4 during a first readout period and are supplied to the arithmetic unit 1. Then the samples Y2, Y9, Y3, Y8, Y4, Y7, Y5 and Y6 during the next following period occur. Y3, Y10, Y4, Y9, Y5, Y8, Y6 and Y7 are read out during a third readout period and so forth. The blocks of samples read out during the individual readout period thus differ from each other in that they are respectively updated as compared to the respectively preceding block by elimination of the oldest samples still present therein and by the addition of a new sample.

Figure 6:
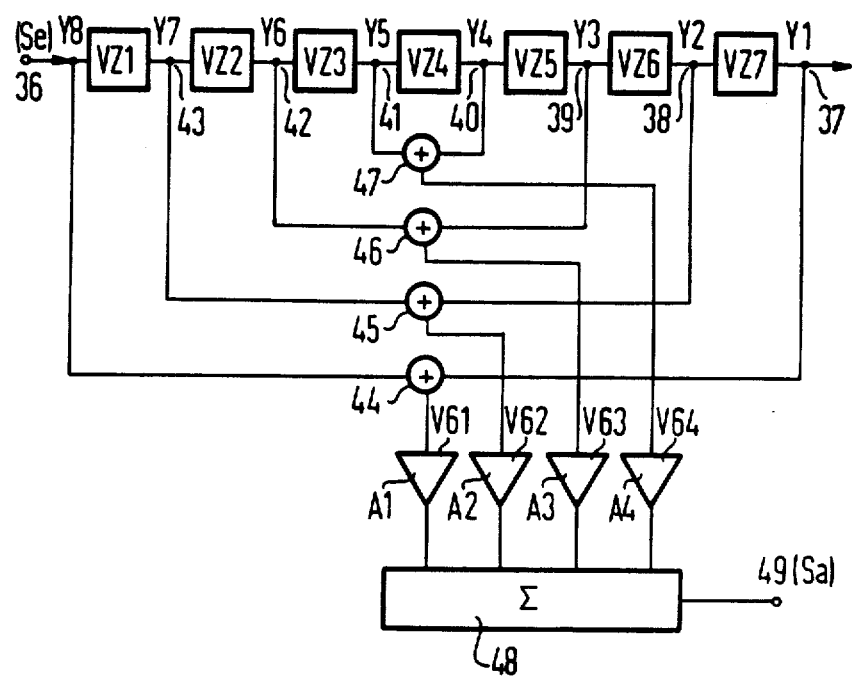
FIG. 6 is a block diagram of a transversal filter with symmetrical coefficients of the embodiment in FIG. 4.

The method of the invention as explained with reference to FIG. 5 can be advantageously employed so as to subject a signal Se to a filter function which corresponds to a linear-phase transversal filter having symmetrical coefficients according to the block diagram illustrated in FIG. 6. A delay line comprises the stages VZ1 through VZ7 connected as illustrated in FIG. 6. The signal Se is dissected into individual analog samples Y1, Y2 etc. and are available at the filter output 36. After the seventh sampling period the samples from Y1 through Y8 can be tapped at the outputs 37 through 43 and at the filter input 36. As a consequence of the symmetrical filter coefficients, both the sample appearing at the output 37 as well as the sample appearing at the input 36 are to be multiplied with the same filter coefficient A1. Those appearing at 38 and 43 are to be multiplied with a coefficient A2. Those samples appearing at points 39 and 42 are to be multiplied with a coefficient A3 and those samples appearing at 40 and 41 are to be multiplied with a coefficient A4. Since the products thus formed are to be added to each other, the same results can be obtained by first adding two samples to be respectively multiplied by the same filter coefficient and to multiply the intermediate sums thus occurring with this respective filter coefficient. This is accomplished in the amplifiers V61 through V64 which respectively have gains of A1 through A4. For this purpose, the circuit points 37 and 36 are supplied to a first adding element 44 which has an output connected to the input of amplifier V61. The circuit points 38 and 43 are supplied through an adding element 45 to the input of amplifier V62. The circuit points 39 and 42 are supplied through an adding element 46 to the input of amplifier 63. Circuit points 40 and 41 are added by adding element 47 and are supplied to the input of amplifier V64. The outputs of the amplifiers V61 through V64 are connected to the input of a summing circuit 48 which has an output 49 where the filtered output signal Sa is available.

A first function value of Sa is formed in a fashion such that the products A1·(Y1+Y8), A2·(Y2+Y7), A3·(Y3+Y6) and A4·(Y4+Y5) occurring in amplifiers V61 through V64 are added to each other in the summing circuit 48. The next function value of Sa which is shifted relative to the first value by the delay time of one of the stages of VZi is formed by means of summing of the products A1·(Y2+Y9), A2·(Y3+Y8), A3·(Y4+Y7) and A4·(Y5+Y6), etc. In general, respective blocks of eight samples are added to each other in pairs in the clock of the sampling of Se and the arising intermediate sums are multiplied by the filter coefficients A1 ... A4 and the arising products are added to each other.

The function values of the filter output function Sa of FIG. 6 are obtained with the data processing system of FIG. 4 when the samples supplied in the blocks to the arithmetic unit which are Y1, Y8, Y2, Y7, Y3, Y6, Y4 and Y5 in the first block and Y2, Y9, Y3, Y8, Y4, Y7, Y5 and Y6 are in the second block. This continues in the same fashion. These samples are respectively added to each other in pairs in the arithmetic unit 1 and the deriving intermediate sums are multiplied with respective filter coefficients A1 ... A4 which are stored in a register and the products thus formed are added to each other. The function values of Sa calculated in this fashion in the arithmetic unit 1 are then supplied as a output onto line 9 by way of the bus line 4 and the corresponding through-connected input/output unit 5 and are converted in the digital to analog converter 10 into analog values which appear at the output terminal 11. Particularly after filtration in a following low pass filter, the sum of the analog values appearing at output terminal 11 form an analog output signal Sa.

Figure 7:
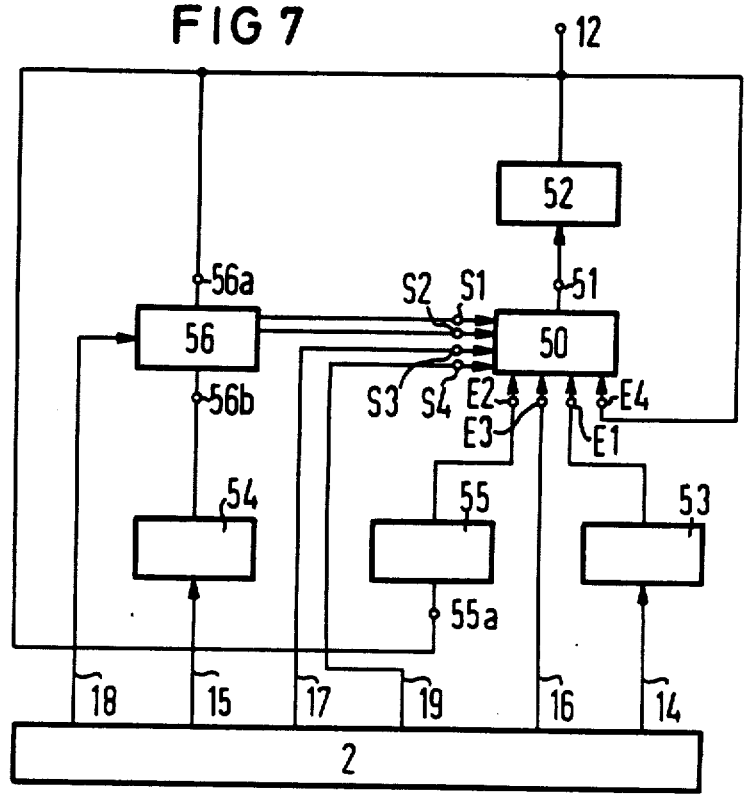
FIG. 7 is a block diagram illustrating the address modification unit.

FIG. 7 illustrates a preferred embodiment of the address modification unit 13 shown in FIG. 1 and also the address units 13' and 13" illustrated in FIG. 4. An address multiplexer 50 has an output 51 connected to the input of an address register 52. The output of address register 52 is connected to the address input 12 of the memory 3 illustrated in FIG. 1. Also, a register 53 for storing a lower limit range of memory locations and a register 54 for storing an upper limit range of memory locations are provided and their inputs are respectively connected to the control unit 2 via the line groups 14 and 15. An incrementing device 55 receives an input 55a from the output of the address register 52. The outputs of the registers 53 and of the incrementing device 55 are connected to the inputs E1 and E2 of the address multiplexer 50. The address input line 16 connects the control unit 2 to the input E3 of the address multiplexer 50. The output of the address register 52 is connected to the input E4 of the address multiplexer 50. The outputs of the address register 52 and of the register 54 are applied to inputs 56a and 56b of a logic circuit 56 which is driven by the control unit 2 by way of the line 18. Two outputs of the logic circuit 56 are connected to two control inputs S1 and S2 of the address multiplexer 50. Two further control inputs S3 and S4 for the address multiplexer 50 are supplied by lines 17 and 19 from the control unit 2. By supplying a control signal to the control input S1, the input E1 will be through-connected to the output 51 of the addresss multiplexer 50. Each of the inputs E2, E3 or E4 is through-connected by a control signal at S2, S3 or S4 and will be supplied to the output terminal 51 of the address multiplier 50. The logic circuit 56 operates such that when the contents of the address register 52 and the register 54 are equal, a control signal is transmitted by way of the one output to S1 depending on an instruction signal on line 18. When there is inequality between the contents of the address register 52 and register 54, a control signal is transmitted via the other output to S2 which depends on an instruction signal on line 18.

For cyclically addressing the memory 3 by way of the address modification unit 13, a binary number which represents the lower limit of the range of memory locations is input to the register 35 by line 14. Another binary number which denotes the upper limit of the range of memory locations is input to the register 54 by way of line 15. When a further binary number lying between these two binary numbers is then input for example by way of the address input line 16 and this is through-connected by an instruction signal on line 17 to the output 51 of the address multiplexer 50 via E3, then this binary number is transmitted to the address register 52. An address that lies within the established range of memory locations is thus output through the address register 52. For a continuous cyclical addressing within the memory area, it is then sufficient to supply a series of instruction signals to the logic circuit 56 by way of line 16. Each of these instructions signals initiates the logic circuit to emit a control signal to the input S2 under the precondition that the respective address output by address register 52 lies within the range of memory locations. Since the next-higher address is automatically derived in incrementing device 55 from the respective output address which also lies at the input 55a of the incrementing device 55 and which is applied to the input E2, the arrival of a control signal at the input S2 means that the next higher address is through-connected through address multiplexer 50 and address register 52 to the output terminal 12 of the address modification unit 13. When the address register 52 outputs an address that corresponds to the upper range limit, than the same register contents occur in the registers 52 and 54. The next following instruction signals on line 18 thus initiates the logic circuit 56 to output a signal to the input S1 of address multiplexer 50. This, however, means that the address stored in the register 53 and corresponding to the lower limit of the range of memory locations procedes via E1, the address multiplexer 50 and the address register 52 to the output terminal 12 of the address modification 13. The next following instruction signals on line 18 then again initiate the output of an address sequence or string which traverses the range of memory locations in steps and in ascending direction.

The incremental device 55 may consist of a binary counter which automatically outputs a binary number which is increased by a certain increment as, for example, 1 to the input E2 of the address multiplexer 50 when input of a binary number occurs at the input 55a.

Figure 8:
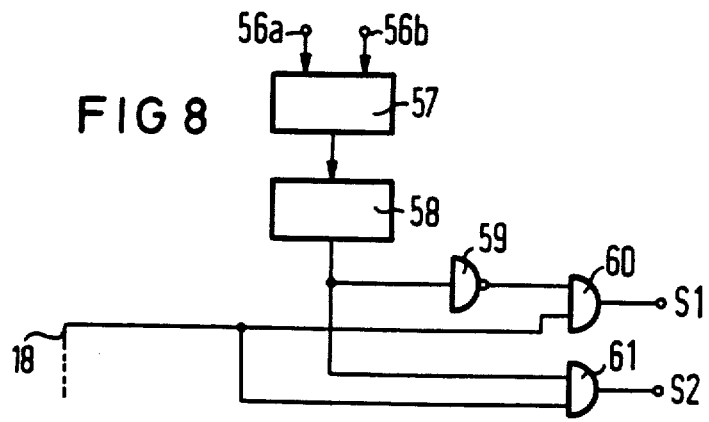
FIG. 8 is a block diagram of the logic circuit illustrated in FIG. 7.

A preferred circuit for producing the logic circuit 56 is illustrated in FIG. 8. The n-poled inputs 56a and 56b of logic circuit 56 simultaneously represent the inputs of an exclusive-OR element 57 which has n-poled output that is conducted to the n inputs of OR circuit 58. The output of the OR circuit 58 is connected through an inverter 59 to the first input of an AND element 60 and also is directly connected to the first input of a second AND element 61. The second inputs of the AND element 60 and 61 are wired to the control line 18. The output of the AND element 60 is conducted to the control input S1 of the address multiplexer 50 and the output of the AND element 61 is connected to the control input S2 of the address multiplexer 50. A logical "1" always occurs on the output of the OR circuit 58 when the n-place binary numbers supplied by inputs 56a and 56b differ from each other. That means that the AND element 60 will be inhibited and the instruction signals accepted on line 18 are transmitted by way of AND element 61 to S2 and cause an incrementing onwarding of the respective output address. When, however, the contents of registers 52 and 54 are identical, then identical binary numbers are supplied at inputs 56a and 56b. A logical "0" then appears at the output of OR gate 58 and the AND element 60 transmits the next following instruction signal on line 18 to the control input S1 and at the same time the AND element 61 is inhibited.

When the incrementing device 55 illustrated in FIG. 7 is replaced by a de-incrementing means which for example can be composed of a downcounter, and when the register is employed at the same time for storing the lower limit of the range of memory locations and the register 53 is employed for storing the upper limit of the range of memory locations, than a cyclical addressing occurs wherein the range of memory locations lying between these limits is respectively traversed in descending order by the individual address sequences. When using the apparatus and methods of the inventions illustrated in FIGS. 2 and 5, reversal and directions of all address runs controlled by the logic circuit 56 would then occur both during the first phase, i.e. during the writing of the samples to be stored as well as during the second phase i.e. during the readout of the samples to be processed and during the overwriting of individual stored samples by new values.

Although the invention has been described with respect to preferred embodiments, it is not to be so limited as changes and modifications may be made therein which are within the full intended scope as defined by the appended claims.

We claim as our invention:

1. A method for processing samples of a time-dependent signal in a data processing system comprising an arithmetic unit (1), a control unit (2), a memory (3) which is connected to said arithmetic unit (1) with a bus line (4) and a first address modification unit (13) which is mounted between said control unit (2) and an address input (12) of said memory (3), comprising the steps of (a) producing during a first phase, with said address modification unit (13) outputs and address sequences whose individual addresses traverse in steps a range of memory locations (Z1 . . . Z5) having prescribed range limits (Z1,Z5), (b) writing a sample (Y1 . . . Y5) of said time-dependent signal into each of the memory locations (P1 . . . P5) thus addressed, (c) outputting in a following second phase an address sequence such that said range of memory locations (Z1 . . . Z5) is cyclically traversed in the respectively same direction in a plurality of runs so that one of said range limits (Z1) is reached after the beginning of the first run,(d) replacing the sample which is stored under the address (Z12) which is the oldest of the samples written during the first phase by writing a further sample (Y6), (e) shifting following each run when a respective individual address (Z23) is reached from run to run by one step relative to the last-mentioned range limit (Z1), (f) replacing by writing the sample (Y2) stored unit this address as the respectively oldest sample written in the first phase which still remains with a further sample (Y7), (g) reading the other memory locations (P1 . . . P5) addressed within all runs of the second phase in cyclical sequence and (b) supplying the readout samples to the arithmetic unit (1).

2. A method according to claim 1, wherein a second address modification unit (13") is disposed between said control unit (2) and said address input (12) of said memory (3) in addition to said first unit (13') and comprising the steps of outputting with said second unit (13") an address sequence in a first phase and the individual addresses of said sequence traversing a second range of memory locations (Z1" . . . Z4") having prescribed range limits in steps; and reading out when every address (Z41", Z32", Z23" . . . ) under which a further sample (Y9, Y10, Y11) is to be written given the address sequences output by said second address modification unit (13") is reached in said second phase the sample previously stored (Y5, Y5, Y7) under this address onto the bus line (4), writing this previously stored sample (Y5, Y6, Y7) into a memory location (P1', P2', P3') addressed by said first address modification unit (13') in which a sample is to be replaced as the sample replacing this sample and, writing said further sample (Y9, Y10, Y11) into said memory and, reading out this written, further sample (Y9, Y10, Y11) onto the bus line (4).

3. A method according to claim 2, comprising the steps of preparing a first sequence of samples of a time-dependent signal (Se) with said first address modification unit (13'), subjecting said time-dependent signal to the filter function of a linear-phase traversal filter having symmetrical filter coefficients, preparing a second sequence of samples of said signal (Se) which follow said first sequence with said second address modification unit (13"); supplying successively the respective first samples from both sequences to said arithmetic unit (1), supplying the second samples from both sequences thereto and preparing the pairs of samples having the same order number from both sample sequences which are thereby formed for the purpose of addition of the samples within the individual pairs and multiplying the intermediate sums which result by symmetrical filter coefficients stored in said arithmetic unit.

4. A method according to claim 1, comprising the steps of preparing samples of a time-dependent signal (Se) which is to be subjected to the filter function of a transversal filter having general filter coefficients with the first address modification unit (13), and preparing for multiplication said samples by general filter coefficients (A1, A2 . . . ) stored in said arithmetic unit.

5. Apparatus for processing samples of a time-dependent signal in a data processing system comprising, an arithmetic unit (1), a control unit (2), a memory (3) which is connected to said arithmetic unit (1) with a bus line (4) and at least one first address modification unit (13, 13', 13") which is mounted between said control, unit (2) and the address input (12) of said memory (13, 13', 13"), where in a first phase, said at least one address modification unit (13) produces outputs and address sequences whose individual addresses traverse in a first direction in steps a range of memory locations (Z1 ... Z5) having prescribed range limits (Z1, Z5) and a sample (Y1 ... Y5) of said time-dependent signal is written into each of the memory locations (P1 ... P5) thus addressed; and in a following second phase, an address sequence is output such that said range of memory locations (Z1 ... Z5) is cyclically traversed in said first direction during a plurality of runs so that in one of said range limits (Z1) the sample which is stored under one of the addresses as the oldest of the samples written during the first phase is replaced by writing a further sample (Y6); and following each run when a respective individual address (Z23) is reached a sample is shifted one step from run to run relative to the last-mentioned range limit (Z1), the sample (Y2) store uner this address is replaced as the respectively oldest sample written in the first phase which still remains and is replaced by writing a further sample (Y7); and the other memory locations (P1 ... P5) addressed within all runs of the second phase are read out in cyclical sequence and the readout samples are supplied to the arithmetic unit (1), and wherein said at least one address modification unit (13, 13', 13'') contains an address register (52) which follows an address multiplexer (50); which receives inputs (E1,E2) which are wired to a second register (53) serving for storage of a lower limit of a range of memory locations and to an incrementing device (55); control inputs (S1,S2) of the address multiplexer (50) are connected to a logic circuit (56); the logic circuit (56) is respectively connected to the outputs of the address register (52) and to a third register (54) for storage of an upper limit of a range of memory locations; and when the contents of the address register (52) and of the third register (54) are equal, the logic circuit (56) through-connects the second register (53) to the output of the address multiplexer (50) and when the said contents of the address register (52) and the third register (54) are unequal, it through-connects the incrementing device (55) thereto.

6. Apparatus according to claim 5 wherein said inputs (E1,E2) are connected to a fourth register for storing an upper limit of a range of memory locations and to a de-incrementing device, control input (S1, S2) of said address multiplexer (50) are connected to said logic circuit (56), said logic circuit (56) is respectively connected to the outputs of a fifth register for storing a lower limit of a range of memory locations; and said logic circuit (56), when the contents of the address register (52) and the fifth register are equal connects the fourth register to the output of the address multiplexer (50) and when the contents of the address register (52) and the fifth register are not equal said logic circuit (56) connects the de-incrementing device thereto.

7. Apparatus according to claim 6, wherein the outputs of said third register (54) or said fifth register and said address register (52) are connected to an exclusive-OR circuit (57) contained in said logic circuit (56), the output of said exclusive-OR circuit supplied as inputs of an OR circuit (58), output of the OR circuit (58) connected to the first input of a first AND element (60) through an inverter (59) and also to the first input of a second AND element (61), second inputs of both AND elements (60, 61) connected to a control input of the logic circuit (56); and the outputs of said AND elements (60, 61) are respectively connected to said control inputs (S1, S2) of said address multiplexer (50).

8. Apparatus according to claim 5, wherein the outputs of said third register (54) and said address register (52) are connected to an exclusive-OR circuit (57) contained in said logic circuit (56), the output of said exclusive-OR circuit supplied as inputs of an OR circuit (58), output of the OR circuit (58) connected to the first input of a first AND element (60) through an inverter (59) and also to the first input of a second AND element (61), second inputs of both AND elements (60, 61) connected to a control input of the logic circuit (56); and the outputs of said AND elements (60, 61) are respectively connected to said control inputs (S1, S2) of said address multiplexer (50).

9. Apparatus according to claim 5, wherein at least the first (13'') and second address modification units (13'') are connected to the inputs of a multiplexer circuit (31) which is controlled by the control unit (2) and the output of said multiplexer circuit (31) is applied to the address input (12) of said memory (3).

10. Apparatus according to claims 5 or 6 or 8 or 7, wherein said address output is supplied to an input (E4) of said address multiplexer (50); and said address multiplexer (50) is provided with a further control input (S4) by which the address register output is connected to the output (51) of said address multiplexer (50), wherein an address input line (16) connects said control unit (2) to an input (E3) of said address multiplexer (50); and said address multiplexer (50) is provided with an additional control input (S3) by which the address input line (16) is connected to the output (51) of said address multiplexer (50).

* * * * *